United States Patent
Maenpa et al.

(10) Patent No.: US 8,044,857 B2
(45) Date of Patent: Oct. 25, 2011

(54) SYSTEM AND METHOD FOR CORRECTING GLOBAL NAVIGATION SATELLITE SYSTEM PSEUDORANGE MEASUREMENTS IN RECEIVERS HAVING CONTROLLED RECEPTION PATTERN ANTENNAS

(75) Inventors: Jon E. Maenpa, Redondo Beach, CA (US); Andrew M. Hautzik, Rancho Palos Verdes, CA (US); Patrick M. Sain, Torrance, CA (US)

(73) Assignee: Raytheon Company, Waltham, MA (US)

(*) Notice: Subject to any disclaimer, the term of this patent is extended or adjusted under 35 U.S.C. 154(b) by 161 days.

(21) Appl. No.: 12/548,387

(22) Filed: Aug. 26, 2009

(65) Prior Publication Data
US 2011/0050489 A1    Mar. 3, 2011

(51) Int. Cl.
*H01Q 3/26* (2006.01)
*G01S 19/23* (2010.01)
*G01S 19/37* (2010.01)
(52) U.S. Cl. .............. 342/368; 342/357.62; 342/357.77
(58) Field of Classification Search ............ 342/357.23, 342/357.62, 357.72, 357.75–357.77, 368
See application file for complete search history.

(56) References Cited

U.S. PATENT DOCUMENTS

| | | | |
|---|---|---|---|
| 5,410,321 A | 4/1995 | Gordon et al. | |
| 5,694,416 A | 12/1997 | Johnson | |
| 5,949,372 A | 9/1999 | Lennen | |
| 5,955,987 A | 9/1999 | Murphy et al. | |
| 6,049,307 A | 4/2000 | Lim | |
| 6,266,007 B1 | 7/2001 | Lennen | |
| 6,469,667 B2 | 10/2002 | Fox et al. | |
| 6,642,898 B2 | 11/2003 | Eason | |
| 6,727,846 B1 | 4/2004 | Brown | |
| 6,744,408 B1 | 6/2004 | Stockmaster | |
| 6,828,935 B1 | 12/2004 | Dunn et al. | |
| 6,847,328 B1 | 1/2005 | Libonati et al. | |

(Continued)

FOREIGN PATENT DOCUMENTS
JP    03-234128 A    10/1991

OTHER PUBLICATIONS

Ung Suok Kim, "Mitigation of Signal Biases Introduced by Controlled Reception Pattern Antennas in a High Integrity Carrier Phase Differential GPS System", PhD dissertation, Stanford Univ., published Mar. 2007, 150 total pages.

(Continued)

*Primary Examiner* — Thomas Tarcza
*Assistant Examiner* — Cassie Galt
(74) *Attorney, Agent, or Firm* — Christie, Parker & Hale, LLP (57) ABSTRACT

Global Navigation Satellite System (GNSS) pseudorange measurements are compensated for receiver hardware and directionally dependent antenna errors to obtain desired accuracies for high precision GNSS positioning applications using a multiple element controlled reception pattern antenna (CRPA). Pseudorange errors are calibrated and stored in a sky map by azimuth, elevation, radio frequency (RF) channel, and frequency. Corrections are applied in real time to each pseudorange measurement by applying a combination of the stored errors. The coefficients of the errors in the combination are computed as a function of steering vectors and CRPA filter weights. This implements a generalized pseudorange correction able to compensate a GNSS CRPA sensor for channel dependent errors such as group delay for both the case of uniform weights for all frequencies and the more complex case of frequency-dependent weights.

13 Claims, 6 Drawing Sheets

U.S. PATENT DOCUMENTS

| | | |
|---|---|---|
| 6,965,816 B2 | 11/2005 | Walker |
| 6,992,643 B2 | 1/2006 | Fox et al. |
| 6,999,027 B1 * | 2/2006 | Stockmaster ............ 342/357.29 |
| 7,015,858 B2 | 3/2006 | Fuchser et al. |
| 7,106,249 B2 | 9/2006 | Kubo et al. |
| 7,161,528 B2 | 1/2007 | Kirby et al. |
| 7,181,247 B1 | 2/2007 | Melick et al. |
| 7,212,921 B2 | 5/2007 | Jeerage et al. |
| 7,304,605 B2 * | 12/2007 | Wells ........................ 342/357.62 |
| 7,324,064 B2 | 1/2008 | Fox et al. |
| 7,336,736 B2 | 2/2008 | Leblond et al. |
| 7,340,283 B1 | 3/2008 | Melick et al. |
| 7,382,313 B1 | 6/2008 | Goad |
| 7,440,988 B2 | 10/2008 | Grobert |
| 7,525,482 B1 | 4/2009 | Lackey et al. |
| 2005/0159891 A1 | 7/2005 | Cohen et al. |
| 2009/0066574 A1 | 3/2009 | De Lorenzo et al. |

OTHER PUBLICATIONS

Office Action for U.S. Appl. No. 12/548,381, filed Aug. 26, 2009, Office Action dated Dec. 22, 2010 (15 pgs.).

Mader, "GPS Antenna Calibration at the National Geodetic Survey", Silver Spring, MD (date unknown) (10 pgs.).

GPS Antenna Calibration, "Calibrated Antennas:", http://www.ngs.noaa.gov/ANTCAL/, Jun. 11, 2009 (1 pg.).

Extended Search Report for European Applicatin No. 11152542.4, Extended Search Report dated Jun. 29, 2011 and mailed Jul. 15, 2011 (7 pgs.).

Ung Suok Kim, "Mitigation of Signal Biases Introduced By Controlled Reception Pattern Antennas In A High Integrity Carrier Phase Differential GPS System", PhD dissertation, Stanford University, Mar. 31, 2007 (150 pgs.).

* cited by examiner

FIG. 1
(CRPA)

| n | $A_n$ | n | $A_n$ | n | $A_n$ | n | $A_n$ |
|---|---|---|---|---|---|---|---|
| 0 | 0.02382 | 16 | 0.01499 | 32 | 0.00250 | 48 | 0.00063 |
| 1 | 0.02378 | 17 | 0.01408 | 33 | 0.00206 | 49 | 0.00077 |
| 2 | 0.02366 | 18 | 0.01315 | 34 | 0.00166 | 50 | 0.00092 |
| 3 | 0.02346 | 19 | 0.01223 | 35 | 0.00132 | 51 | 0.00107 |
| 4 | 0.02317 | 20 | 0.01131 | 36 | 0.00102 | 52 | 0.00123 |
| 5 | 0.02281 | 21 | 0.01040 | 37 | 0.00078 | 53 | 0.00139 |
| 6 | 0.02238 | 22 | 0.00951 | 38 | 0.00058 | 54 | 0.00154 |
| 7 | 0.02188 | 23 | 0.00864 | 39 | 0.00043 | 55 | 0.00169 |
| 8 | 0.02131 | 24 | 0.00780 | 40 | 0.00032 | 56 | 0.00183 |
| 9 | 0.02067 | 25 | 0.00699 | 41 | 0.00025 | 57 | 0.00196 |
| 10 | 0.01999 | 26 | 0.00621 | 42 | 0.00022 | 58 | 0.00208 |
| 11 | 0.01925 | 27 | 0.00548 | 43 | 0.00022 | 59 | 0.00218 |
| 12 | 0.01846 | 28 | 0.00479 | 44 | 0.00025 | 60 | 0.00226 |
| 13 | 0.01764 | 29 | 0.00414 | 45 | 0.00032 | 61 | 0.00233 |
| 14 | 0.01678 | 30 | 0.00355 | 46 | 0.00040 | 62 | 0.00238 |
| 15 | 0.01590 | 31 | 0.00300 | 47 | 0.00051 | 63 | 0.00241 |

FIG. 5A (table, part 1)

| n | $A_n$ |
|---|---|
| 64 | 0.00242 |
| 65 | 0.00241 |
| 66 | 0.00238 |
| 67 | 0.00233 |
| 68 | 0.00226 |
| 69 | 0.00218 |
| 70 | 0.00208 |
| 71 | 0.00196 |
| 72 | 0.00183 |
| 73 | 0.00169 |
| 74 | 0.00154 |
| 75 | 0.00139 |
| 76 | 0.00123 |
| 77 | 0.00107 |
| 78 | 0.00092 |
| 79 | 0.00077 |

| n | $A_n$ |
|---|---|
| 80 | 0.00063 |
| 81 | 0.00051 |
| 82 | 0.00040 |
| 83 | 0.00032 |
| 84 | 0.00025 |
| 85 | 0.00022 |
| 86 | 0.00022 |
| 87 | 0.00025 |
| 88 | 0.00032 |
| 89 | 0.00043 |
| 90 | 0.00058 |
| 91 | 0.00078 |
| 92 | 0.00102 |
| 93 | 0.00132 |
| 94 | 0.00166 |
| 95 | 0.00206 |

| n | $A_n$ |
|---|---|
| 96 | 0.00250 |
| 97 | 0.00300 |
| 98 | 0.00355 |
| 99 | 0.00414 |
| 100 | 0.00479 |
| 101 | 0.00548 |
| 102 | 0.00621 |
| 103 | 0.00699 |
| 104 | 0.00780 |
| 105 | 0.00864 |
| 106 | 0.00951 |
| 107 | 0.01040 |
| 108 | 0.01131 |
| 109 | 0.01223 |
| 110 | 0.01315 |
| 111 | 0.01408 |

| n | $A_n$ |
|---|---|
| 112 | 0.01499 |
| 113 | 0.01590 |
| 114 | 0.01678 |
| 115 | 0.01764 |
| 116 | 0.01846 |
| 117 | 0.01925 |
| 118 | 0.01999 |
| 119 | 0.02067 |
| 120 | 0.02131 |
| 121 | 0.02188 |
| 122 | 0.02238 |
| 123 | 0.02281 |
| 124 | 0.02317 |
| 125 | 0.02346 |
| 126 | 0.02366 |
| 127 | 0.02378 |

FIG. 5B (table, part 2)

SYSTEM AND METHOD FOR CORRECTING GLOBAL NAVIGATION SATELLITE SYSTEM PSEUDORANGE MEASUREMENTS IN RECEIVERS HAVING CONTROLLED RECEPTION PATTERN ANTENNAS

STATEMENT REGARDING FEDERALLY SPONSORED RESEARCH OR DEVELOPMENT

This invention was made with government support under Contract No. N00019-02-C-3002 awarded by the Department of the Navy. The government has certain rights to this invention.

CROSS-REFERENCE TO RELATED APPLICATION(S)

This application is related to U.S. patent application entitled "SYSTEM AND METHOD FOR CORRECTING GLOBAL NAVIGATION SATELLITE SYSTEM CARRIER PHASE MEASUREMENTS IN RECEIVERS HAVING CONTROLLED RECEPTION PATTERN ANTENNAS," filed <concurrently herewith>, the entire content of which is incorporated herein by reference.

BACKGROUND OF THE INVENTION

1. Field of the Invention

The present invention relates to the field of Global Navigation Satellite Systems (GNSS), such as the Global Positioning System (GPS), and, more particularly, to range measurement corrections in such systems.

2. Description of the Related Art

Global Navigation Satellite Systems (GNSS) use a constellation of dispersed satellites with atomic clocks orbiting the Earth that transmit predictable signals at exact times. The modulation used by these signals and the data messages included enable the receivers to determine highly accurate navigational locations anywhere on the Earth. The receiver calculates its position by carefully measuring the time of arrival of the signals sent by several of the satellites. Each satellite continually transmits messages containing the time the message was sent, precise orbital information, and the general system health and approximate orbits of all the satellites. By calculating the difference between the broadcast "transmit time" and the received "time of arrival," a time of propagation can be determined and transformed into a range using the speed of propagation "c".

GNSS is considered a dual-use technology, namely, a technology that has significant civilian and military applications. Accordingly, for an example GNSS like the Global Positioning System (GPS), the satellites broadcast on precisely defined carrier frequencies with well-defined modulation. The GPS data and timing signals intended for everyone's use have a publicly-defined format contained in Interface Specification IS-GPS-200, and are unencrypted, while those timing signals intended for military use are not publicly defined and are encrypted and the military specific information content is also encrypted. The satellite employs a pseudorandom code, which is used to modulate the carrier frequency in order to transmit the precise time marks. The carrier frequencies are over 1 GHz, while the code rates are considerably lower. GPS chip rates are roughly 10 MHz for the military code and 1 MHz for the civilian code. Additionally, data messages containing satellite orbit, system health, and other necessary information are transmitted at even a lower rate of 50 bits per second.

Most conventional civilian navigational systems receive a GNSS signal through a single element fixed reception pattern antenna (FRPA) coupled to the receiver. Many military systems, however, use a multiple element controlled reception pattern antenna (CRPA) system to receive a GNSS signal. CRPA systems are much more resistant to the effects of intentional jamming of the GNSS frequencies than are FRPA systems and the signals from each of the elements can be coherently added to increase the carrier-to-noise-density ratio ($C/N_O$) over that of a conventional FRPA type antenna for each received signal.

With GNSS, the receiver measures the transit time, using the precise time marks provided by the pseudorandom code, from a satellite and computes the distance to that satellite by multiplying the transit time by the speed of light. These distance computations are called "pseudoranges" since there is almost always a time difference between the atomic satellite clocks used to create the precise time marks and the receiver clocks used to decode the precise time marks. This clock error is common to all measurements since the atomic satellite clocks are all synchronized, and results in a common range error. This common range error is what forms what is often called a "pseudorange" from an absolute range. Other effects that give rise to range errors include atmospheric, multipath, and receiver and antenna hardware.

Geometric multilateration is used to pinpoint the receiver's location by combining these pseudoranges with the corresponding locations of the satellites, using the data from at least four different satellites. Four pseudoranges also allow determination of the clock bias associated with the common range error described above, which adds a fourth dimension of uncertainty, when trying to solve for the other three dimensions of a physical location. Nonetheless, other effects that contribute to range measurement errors still remain. Identifying and attempting to account for the multiple sources of errors is an important step to improving the accuracy of locations determined through GNSS.

Atmospheric (i.e., tropospheric and ionospheric) delays are usually the next most significant source of error. The Earth's atmosphere slows down the speed of the satellite transmissions. These errors can be compensated for in a number of ways. For instance, using satellites that are more directly overhead helps because their transmissions travel through less atmosphere than when using satellites closer to the horizon. In addition, having the satellites transmit on multiple frequencies helps mitigate the ionospheric induced errors since it is frequency-dependent, so can be mitigated by combining the measurements from the two frequencies into a single ionospheric free measurement. Finally, relative positioning systems, such as Differential GPS, use strategically placed monitor stations at exact locations to determine at any given time what the overall transmission delay (including effects like atmospheric) is for each satellite. These monitor stations then broadcast these delays to all nearby receivers, which then can make the corrections to each of the corresponding satellites.

There are still other effects, most notably receiver antenna hardware, which cannot be compensated through any of the above techniques. To the extent that such effects, such as directionally dependent group delay errors, are not common between different satellites (common errors disappear as part of the clock bias correction calculated when determining location), they can affect the accuracy of the resulting positional calculation. Multiple element receiver antennas add complexity to the mitigation of these non-common errors, because the directionally dependent group delay errors may differ between antenna elements. Each hardware path contributes a different delay to the overall measured time of reception. Accounting for these more complex differences helps systems using multiple element antennas achieve the same accuracy that single element antennas are capable of achieving.

Because the satellite signals are relatively weak, it is fairly straightforward to intentionally jam such signals, either by increasing the noise floor by transmitting broadband noise or by attempting to exceed the dynamic range of the receiver hardware with powerful narrowband signals. Additionally, since the satellite signal structure is so precisely defined and predictable, it can be spoofed by a transmission using the same frequencies and signal structure. This is unacceptable for military applications, so they rely on encrypted signals to thwart any spoofed transmissions, but are still susceptible to intentional interference on the same frequencies. Consequently, for military applications, there is a need to reduce the effect of jamming, so the CRPA system is sometimes used in place of the FRPA system.

Intentional interference is usually significantly stronger than actual satellite transmissions. CRPA systems can use techniques such as nulling (combining the signals received by the CRPA's elements in such a way as to make the jamming signal cancel itself out) or beam steering (combining the signals received by the CRPA's elements in such a way as to amplify the satellite signal) to overcome intentional jamming. Note that beam steering doesn't physically direct the antenna hardware, rather it uses phased array techniques to compensate for the phase of arrival difference caused by the different path length to each element from any satellite to make the signals from each antenna element phase coherent so they add together in amplitude. Also note that it is possible to perform nulling and beam steering at the same time.

For high quality GNSS pseudorange measurements, non-common receiver hardware induced errors and directionally dependent antenna induced errors must be compensated for to obtain desired accuracies for high precision GNSS requirements in certain applications. The problem of non-common receiver hardware induced errors is a significant issue in sensors that receive the Russian Global Navigation Satellite System (GLONASS), and may be mitigated by using an internally generated calibration signal to measure and eliminate receiver induced errors from the pseudorange measurements, as disclosed by Lennen (U.S. Pat. Nos. 5,949,372 and 6,266,007). The problem of directionally dependent antenna induced errors is straightforward to solve in FRPA GNSS sensors by subtracting the directionally dependent antenna errors from the pseudorange measurements, in a similar manner to the standard method of correcting GNSS carrier phase measurements for FRPA antenna induced errors that have existed for some years. See, for example, Gerald L. Mader, GPS Antenna Calibration at the National Geodetic Survey, the entire content of which is herein incorporated by reference. However, for the complex case of a GNSS receiver employing a CRPA and dynamic beam steering, the multiplicity of combinations of antenna element outputs makes compensation of directionally dependent antenna induced errors more difficult, as the simple subtraction that might be used for FRPA compensation does not work with a CRPA. Compensation of pseudorange measurements for such errors is a problem not addressed in previous GNSS CRPA beam steering sensors.

Therefore, with the conversion from the FRPA based systems to CRPA systems for GNSS applications, there is a need to better compensate for the effects of antenna element errors on pseudorange measurement errors.

SUMMARY OF THE INVENTION

In accordance with the present invention, a generalized pseudorange correction is provided. This correction is able to compensate a multiple element (channel) GNSS CRPA sensor for channel dependent errors such as group delay and wave propagation differences. The correction applies to both the case of uniform beamforming weights for all frequencies and the more complex case of frequency-dependent weights. Pseudorange errors are calibrated during testing and stored in a sky map by azimuth, elevation, RF channel (antenna element), and frequency. Next, corrections are applied in real time to each pseudorange measurement by applying a combination of the stored errors. The coefficients of the errors in the combination are computed as a function of the steering vectors and the CRPA filter weights.

In an exemplary embodiment according to the present invention, an apparatus for calibrating a global navigation satellite system (GNSS) receiver system for group delay errors in GNSS transmitter signals is provided. The apparatus includes: a controlled reception pattern antenna (CRPA) including a plurality of receiving elements and configured to sense a plurality of signals from a plurality of GNSS transmitters using one or more transmitter frequencies; a signal conditioner configured to convert a plurality of sensed GNSS signals to a plurality of time domain digital signals; and a processor. The processor is configured to: convert the time domain digital signals into a plurality of filtered signals using a plurality of signal weights; access group delay calibration correction data for combinations of the plurality of receiving elements, a plurality of transmitter orientations with respect to the CRPA, and the one or more transmitter frequencies; track code modulations of the plurality of filtered signals and convert the filtered signals into GNSS pseudorange measurements for the plurality of GNSS transmitters at the one or more transmitter frequencies; combine the group delay calibration correction data and the signal weights to generate weighted pseudorange error corrections for the plurality of GNSS transmitters at the one or more transmitter frequencies; and combine the weighted pseudorange error corrections and the GNSS pseudorange measurements to generate corrected pseudorange measurements for the plurality of GNSS transmitters at the one or more transmitter frequencies.

In another exemplary embodiment according to the present invention, a method for calibrating a global navigation satellite system (GNSS) receiver system for group delay errors in GNSS transmitter signals is provided. The method includes: sensing a plurality of signals from a plurality of GNSS transmitters with a controlled reception pattern antenna (CRPA) comprising a plurality of receiving elements using one or more transmitter frequencies; converting the plurality of sensed GNSS signals to a plurality of time domain digital signals; converting the time domain digital signals into a plurality of filtered signals using a plurality of signal weights; accessing group delay calibration correction data for combinations of the plurality of receiving elements, a plurality of transmitter orientations with respect to the CRPA, and the one or more transmitter frequencies; tracking code modulations of the plurality of filtered signals and converting the filtered signals into GNSS pseudorange measurements for the plurality of GNSS transmitters at the one or more transmitter frequencies; combining the group delay calibration correction data and the signal weights to generate weighted pseudorange error corrections for the plurality of GNSS transmitters at the one or more transmitter frequencies; and combining the weighted pseudorange error corrections and the GNSS pseudorange measurements to generate corrected pseudorange measurements for the plurality of GNSS transmitters at the one or more transmitter frequencies.

BRIEF DESCRIPTION OF THE DRAWINGS

The accompanying drawings illustrate embodiments of the present invention, and together with the description, serve to explain the principles of the embodiments of the present invention.

FIGS. 5A and 5B depict an example table (in two parts) of the mean square values of the GPS P(Y) code's discrete Fourier transform (DFT) coefficients for a 128-point DFT and a 32 ns sampling interval.

DETAILED DESCRIPTION

This invention reduces pseudorange errors in GNSS receiver hardware through compensation of the group delay components that are inherent in the receiver hardware. The illustrative embodiments that follow are only exemplary applications of the present invention and not intended to limit the scope of the invention.

A preferred embodiment of the invention comprises a GNSS receiver system on an aircraft, the aircraft and system capable of operating in any direction and orientation. The GNSS broadcasts carrier waves on one or more frequencies. For example, note that military GPS uses two carrier frequencies, L1=1.57542 GHz and L2=1.2276 GHz, and a third GPS frequency is being added, L5=1.17645 GHz. The GNSS receiver system uses a receiver connected to a seven-element CRPA along with a carrier-phase correction scheme. Note that the number of elements in the CRPA can vary (fewer elements is simpler and cheaper to build and manage, while more elements provides better intentional jamming protection), but there must be more than one. Note also that the CRPA may not necessarily be aligned along the centerline of the aircraft.

Figure 1:
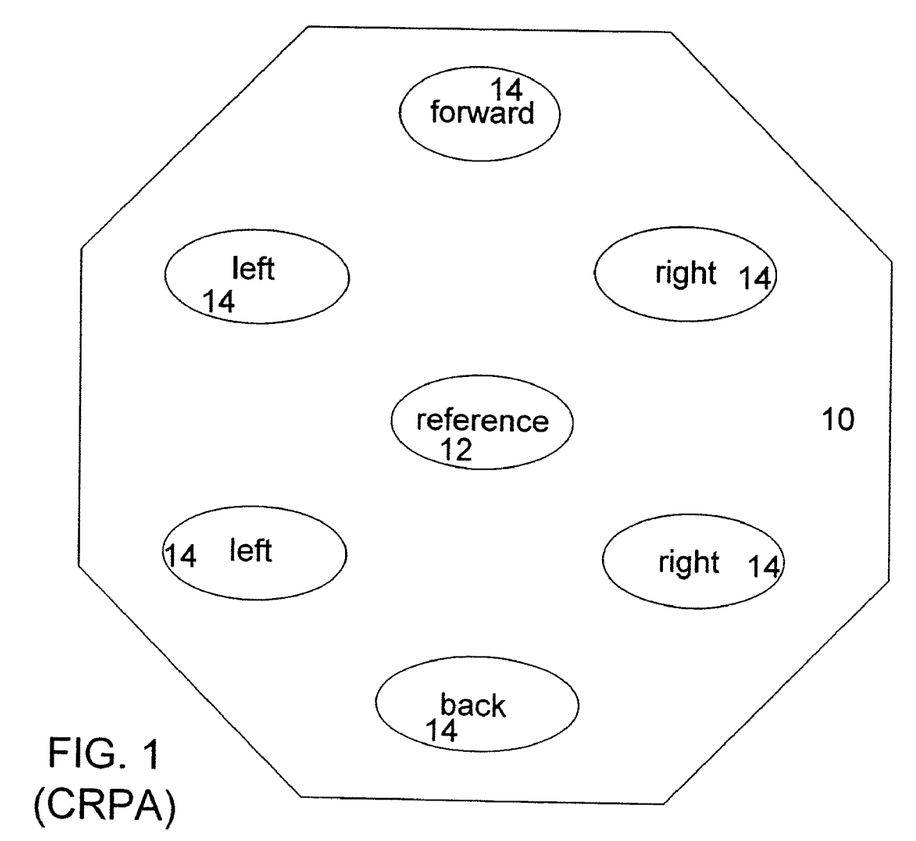
FIG. 1 is an example CRPA layout according to one embodiment of the invention.

FIG. 1 shows an exemplary CRPA 10 comprising seven antenna elements (channels). The seven elements break down into one reference element 12 and six auxiliary elements 14, where the reference element 12 is the element most centered with respect to the seven elements while the six auxiliary elements 14 surround the reference element 12 in a symmetrical layout: one forward, one back, two on the left, and two on the right. Note that a CRPA may consist of other numbers of elements, and the elements may differ in relative orientation, which may be either symmetric or asymmetric.

Figure 2:
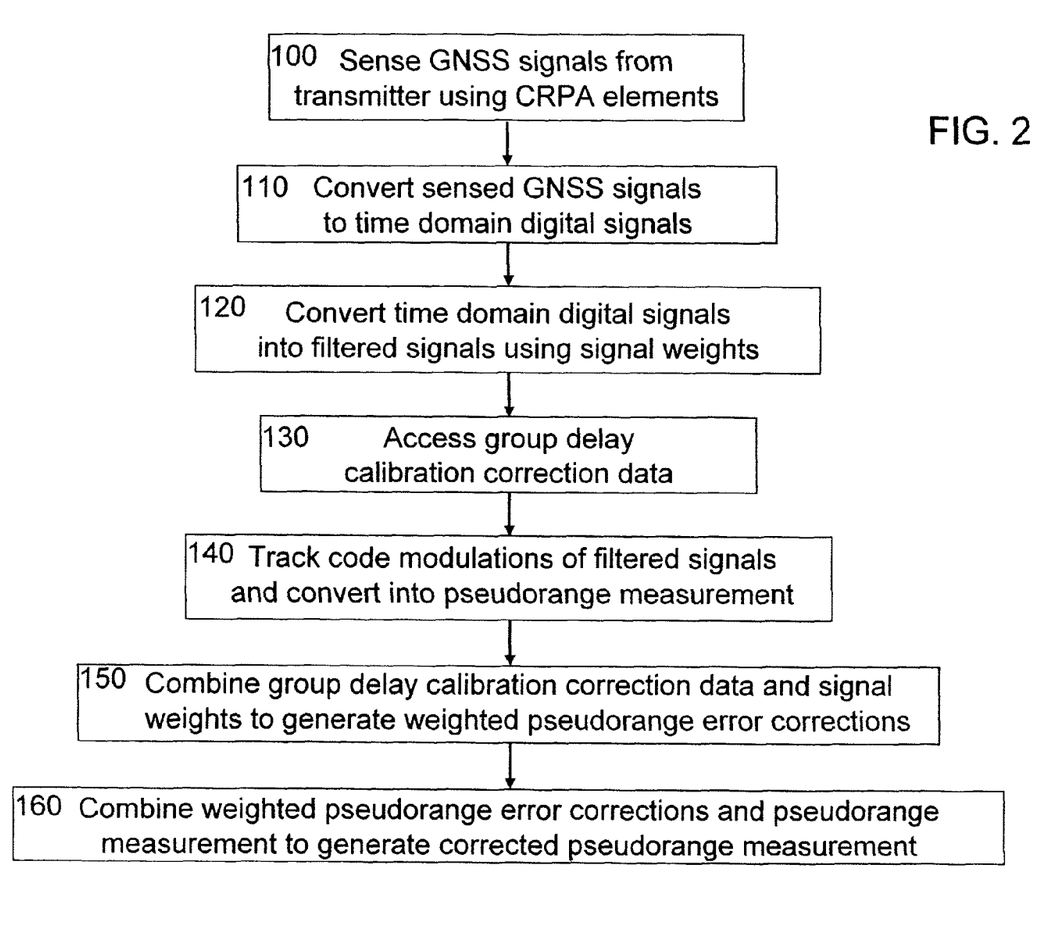
FIG. 2 is an exemplary GNSS CRPA pseudorange correction method according to the present invention.

FIG. 2 shows an example method of correcting a CRPA GNSS pseudorange error from a GNSS transmitter according to the present invention, where the CRPA is mounted in a fixed location on a dynamic platform, such as a moving aircraft or other vehicle. The method starts with step 100, where GNSS signals are sensed from a transmitter—whose line of sight (LOS) with respect to the vehicle is already known from earlier signals and positioning calculations—using the CRPA, each element sensing its own GNSS signals. Next, in step 110, the signals are converted to digital format in the time domain. This allows the signals to be used in GNSS measurement calculations. In step 120, beamforming is applied to the digital signals to combine them into a filtered signal while generating corresponding beamforming weights in real time. Group delay calibration correction data—measured empirically and stored in tables organized by CRPA element and orientation of the transmitter with respect to the CRPA—is accessed in step 130. Then the GNSS pseudorange measurement is formed in step 140 from the filtered signal using a delay-locked loop. While this takes place, in step 150, an attitude sensor, such as an inertial navigation system (INS), determines the vehicle's attitude, which, when combined with the transmitter's LOS with respect to the vehicle, allows the orientation of the transmitter with respect to the CRPA to be determined. This allows the corresponding group delay calibration correction data to be accessed and combined with the beamforming weights to generate weighted pseudorange error corrections. Finally, in step 160, the GNSS pseudorange measurement is corrected by using the weighted pseudorange error corrections.

Figure 3:
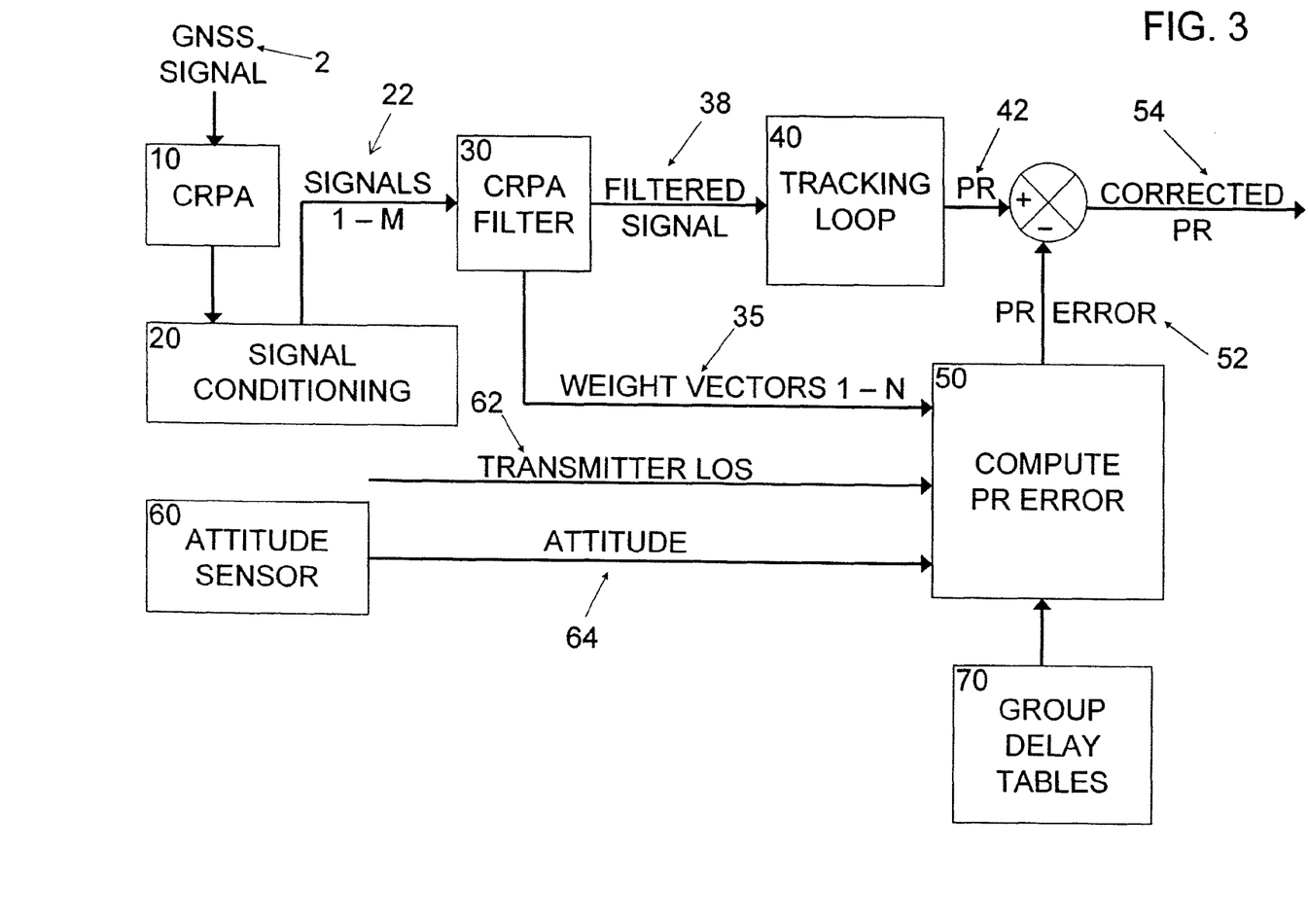
FIG. 3 is a depiction of an exemplary embodiment of a GNSS receiver system for correction of pseudorange errors for group delay in accordance with the present invention when the antenna configuration is a CRPA.

FIG. 3 shows an exemplary embodiment of the present invention as might be installed on a moving vehicle (for instance, an aircraft). More specifically, the CRPA 10 receives a signal 2 from a radio navigation transmitter (satellite). The CRPA consists of M antenna elements (M≧2). At any moment in time, each element is usually receiving or processing a slightly different signal from the satellite because of group delay effects (like the transmitter alignment with respect to the element or effects induced by the internal processing portion of the receiver). The receiver digitally samples the M signals in the time domain as part of signal conditioning 20 and sends the M digital output signals 22 (Signal 1 through Signal M) to CRPA filter 30.

The GNSS receiver can steer a plurality of beams to a plurality of satellites at one or more frequencies. The embodiment described here describes only one of those beams. It is to be understood that the same processing, including the pseudo-range correction, may be duplicated for each beam. The CRPA filter 30 applies a suitable beamforming technique to combine the M different signals into one signal, for each transmitter signal of interest, in the frequency domain using N different frequency bins in the corresponding discrete Fourier transform (DFT) 32 (see FIG. 4). The CRPA filter 30 computes N weight vectors 35 from the M signals 22 as part of the beamforming technique. These N weight vectors 35 are sent to the pseudorange error correction module 50 to assist with correcting the pseudorange error for group delay effects. In addition, the CRPA filter 30 uses the weight vectors 35 to compute a filtered signal 38 from the M signals 22. The receiver sends the filtered signal 38 to a delay-locked loop (DLL), tracking loop 40, which tracks the signal's code modulation and forms a pseudorange (PR) measurement 42.

The error prediction module 50 uses several inputs to determine how to correct this pseudorange measurement 42 for the effects of group delay. First, the error prediction module 50 uses the N weight vectors 35 computed by the CRPA filter 30. The error prediction module 50 also takes the transmitter line of sight (LOS) unit vector 62 in navigation coordinates of the transmitter to the receiver. Next, an attitude sensor 60, such as an inertial navigation system (INS), estimates the vehicle's (and hence the CRPA's) attitude 64. Note that it is assumed that the CRPA 10 remains stationary in the vehicle, so the CRPA's attitude is only a constant correction of the vehicle's attitude 64 and thus, it suffices to input only the vehicle's attitude 64 to the error prediction module 50. Further, note that if the receiver is static, fixed values of attitude 64 may instead be supplied.

The receiver uses the attitude 64 to transform the transmitter LOS unit vector 62 from navigation coordinates to CRPA coordinates. It then computes the transmitter's azimuth and elevation angles from the transformed LOS and uses those angles to look up the group delay tables 70, one table for each antenna element. The tables 70, which contain values measured during CRPA calibration, are indexed by azimuth, elevation, and carrier frequency. Next, the error prediction module 50 uses the transmitter LOS 62, the INS attitude 64, the N weight vectors 35, and the stored tables of group delays 70 to compute the pseudorange error 52 caused by antenna and receiver group delays. Finally, the receiver subtracts the group delay pseudorange error 52 from the measured pseudorange 42 to get the corrected pseudorange 54.

Figure 4:
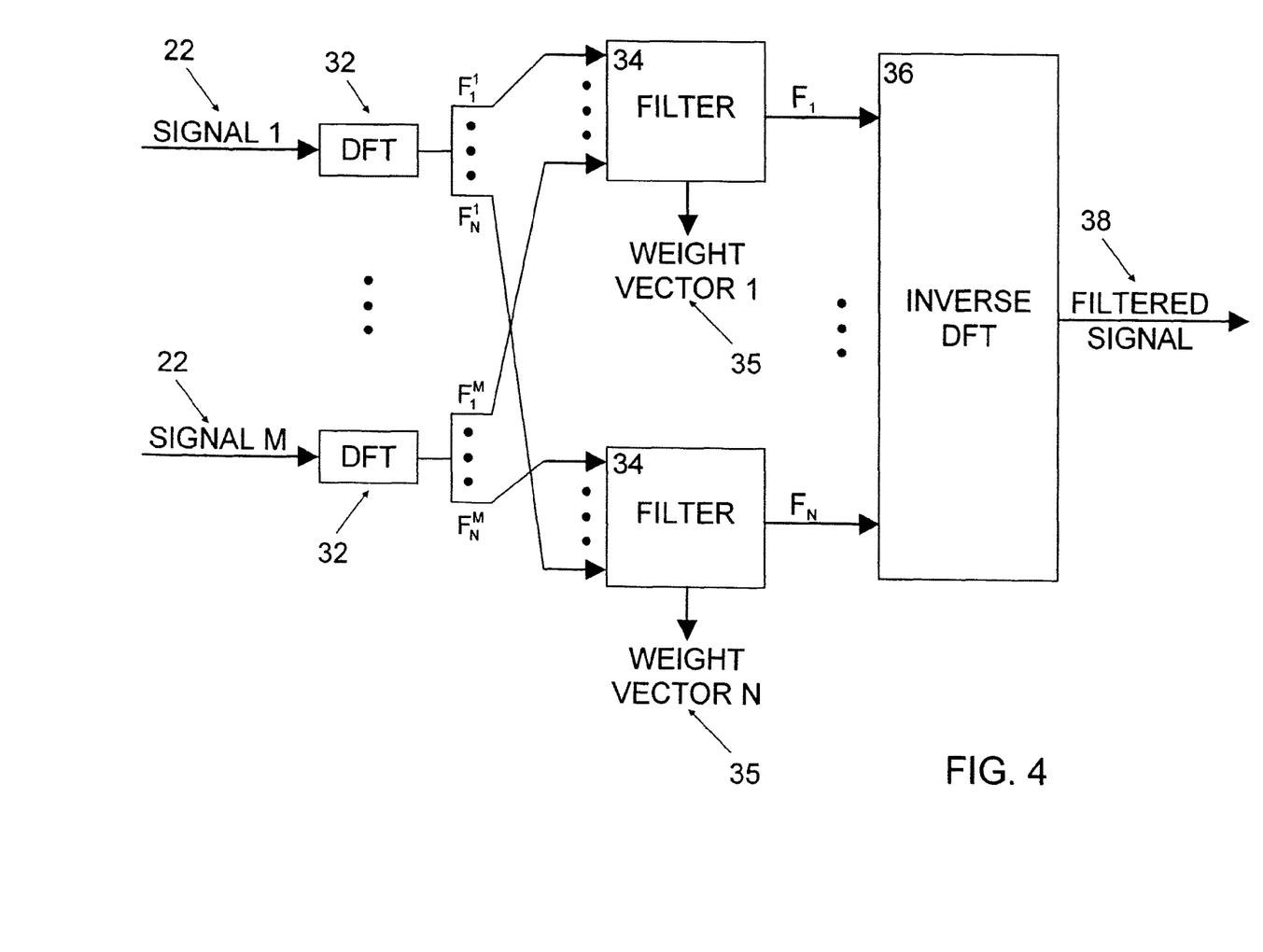
FIG. 4 is a more detailed depiction of the CRPA filter from FIG. 3.

Referring now to FIG. 4, which depicts the CRPA filter 30 shown in FIG. 3, the receiver computes the DFT 32 of each of the M signals 22, thus transforming them from the time domain to the frequency domain. The $m^{th}$ DFT 32 consists of N complex Fourier coefficients $F_1^m, F_2^m, \ldots, F_N^m$, where $m=1, 2, \ldots, M$. The superscript indicates which antenna element received the signal and the subscript indicates the frequency bin. Thus, there are a total of MN coefficients. The receiver uses N identical filters 34 to compute N filtered coefficients ($F_1$ through $F_N$) from the MN coefficients as well as N weight vectors 35 $v_1, v_2, \ldots, v_N$, where $v_n = [w_n^1 \ w_n^2 \ldots w_n^M]$ is a weight vector 35 of M complex weights for each $n=1, 2, \ldots, N$. It then computes the inverse DFT 36 of $F_1$ through $F_N$ to transform the filtered signal 38 back to the time domain. Note that, for some formulas, it is more convenient for the bin number to be 0-origin (that is, $n=0, 1, \ldots, N-1$) versus 1-origin ($n=1, 2, \ldots, N$). The two formats are used interchangeably, with their meaning apparent from the context.

FIGS. 5A and 5B are a two-part table that lists the mean square values of the 128-point DFT coefficients of the GPS P/Y-code for a 32 ns sampling interval. The invention uses these values when computing the M average weights $w_1, w_2, \ldots, w_M$ that are used to predict the pseudorange error 52.

The pseudorange error prediction module 50 in FIG. 3 predicts the pseudorange error by the following steps:
1. Compute path length differences.
2. Compute steering vector.
3. Look up group delays in tables.
4. Compute average weights.
5. Compute pseudorange error.

Step 1 computes path length differences $\Delta t_1, \Delta t_2, \ldots, \Delta t_M$, where $\Delta t_m$ is the amount of time by which the signal arriving at the $m^{th}$ antenna element lags behind the signal arriving at the first element. This is due to the difference between the free space path lengths from the transmitter to the respective antenna element. $\Delta t_m$ is negative when the $m^{th}$ element is closer to the transmitter than the first element is. $\Delta t_1 = 0$.

Step 2 computes the steering vector, which consists of the complex numbers $s_1, s_2, \ldots, s_M$, by the formula $s_m = e^{i\omega \Delta t_m}$, where $\omega$ is the signal's frequency in radians per second.

In Step 3, the empirical group delay for a particular antenna element (as measured during calibration testing) is looked up based on the transmitter's azimuth and elevation angles relative to the CRPA. The group delay for the $m^{th}$ antenna element is extracted from the $m^{th}$ table and is denoted by $\tau_m$.

Step 4 computes the average complex weight $w_m$ for each element $m=1, 2, \ldots, M$. The average is over the N DFT frequency bins. The formula for computing the average weight $w_m$ for the $m^{th}$ element is $$w_m = \frac{C \sum_{n=0}^{N-1} w_n^m A_n e^{i 2\pi n (dC + \tau_m - \Delta t_m)/NT}}{dC + \tau_m - \Delta t_m}$$

where
- T is the sampling interval in seconds
- $w_n^m$ is the weight for the $m^{th}$ element in the $n^{th}$ frequency bin (from the weight vectors 35)
- C is the width of a code chip in seconds (for GPS P/Y code, this is approximately 98 ns)
- d is the delay-locked loop's (DLL's) correlator spacing in code chips. It is typically between ½₀ and ½ in GPS receivers. The invention can be adapted to any correlator spacing by selecting the appropriate value of d.
- $A_n$ is the mean square value of the $n^{th}$ DFT coefficient of the signal's code modulation. As an example, the values of $A_n$ for the GPS P/Y-code with $N=128$ and $T=32$ ns are given in the table in FIGS. 5A and 5B. The invention can be adapted to any code type, DFT order, and sampling interval by selecting the appropriate values of $A_n$.

A different embodiment of the invention uses the following approximation to avoid the expense of storing a table and the difficulty of computing the exact values of $A_n$.

$$A_n \approx \frac{C}{NT} \left( \frac{\sin(\pi C n / NT)}{\pi C n / NT} \right)^2$$

Step 5 computes the pseudorange error by the following formula.

$$\delta PR = \sum_{m=1}^{M} \text{Re}(w_m^* s_m)(\Delta t_m - \tau_m)$$

where the * superscript denotes the complex conjugate.

Further Embodiments

The following describes in more detail the method for correcting pseudorange measurements that are formed by tracking signals received by a CRPA. Such measurements are corrupted by mismatched group delays between the CRPA channels as well as by differences in wave propagation path lengths. Compensating for these effects improves the accuracy of the corresponding GNSS sensor using the CRPA.

The method applies to a CRPA operating in an adaptive beamforming (ABF) or conventional beamforming (CBF) mode. CBF uses a fixed set of weights and time-delays to combine the signals from the sensors in a CRPA, primarily using only information about the location of the antenna elements, the frequency, and the signal directions of interest. In contrast, ABF goes further, generally combining this CBF information with properties of the signals actually received by the array, typically to improve rejection of unwanted signals from other directions.

The method uses calibration constants measured during prior testing.

The method is described in two embodiments. The first embodiment does very little computation but requires the ABF weight vector to be nearly independent of frequency. The second embodiment eliminates this frequency independence requirement but requires significantly more computation. In each case, assume the number of antenna elements (and hence, channels) M is seven (though it can be any number larger than one). Assume further that the elements are arranged as in FIG. 1. Finally, assume that there are two frequencies employed by the GNSS, though this can be any positive number.

Frequency-Independent Embodiment

As a first approximation, assume there is no jamming or the jamming is broadband noise that has a constant power spectral density in the GNSS band. In either case, ABF will compute the same weight vector in every frequency bin if the receiver's thermal noise is white. If the weight vector is independent of frequency, ABF and CBF may be modeled in the time domain and their DFT 32 and inverse DFT 36 operations may be ignored.

The complex signal received by the CRPA reference element 12 is $u(t) = P(t)e^{i(\omega t + \phi)}$, where P is the message code ($\pm 1$), $\omega$ is the carrier frequency, and $\phi$ is the carrier phase. The signal received by the $m^{th}$ antenna element is time-shifted by $\Delta t_m$ relative to the reference element ($|\Delta t_m| < 0.5$ ns) due to the difference between the wave propagation path lengths. The antenna and the analog filters delay the signal by $\tau_m$ and shift its phase by $\theta_m$:

$$u(t+\Delta t_m - \tau_m) = P(t+\Delta t_m - \tau_m)e^{i(\omega t + \omega \Delta t_m - \omega \tau_m + \phi + \theta_m)}$$

The antenna's contribution to $\theta_m$ is sensitive enough to the signal direction that a "sky map" (a table of phase versus azimuth and elevation) is needed to compute it. The same may also be true of $\tau_m$.

The average group delay does not affect accuracy, since it is common to all satellites and hence indistinguishable from clock bias. What matters is the group delay's variation between channels, which is assumed to be less than 4 ns in this embodiment.

As a part of signal conditioning 20, the high-frequency GNSS signal is down-converted to baseband:

$$x_m(t) = P(t+\Delta t_m - \tau_m)e^{i(\omega \Delta t_m - \omega \tau_m + \phi + \theta_m)}$$

The quantity $(\theta_m - \omega \tau_m) \bmod 2\pi$ is measured during a prior inter-channel phase difference calibration, which then determines $e^{i(\theta_m - \omega \tau_m)}$. The CRPA filter 30 computes $\Delta t_m$ in real time based on the orientation of the particular antenna element and the signal source direction and combines it with the calibration data to compute the steering vector components $s_m = e^{i(\omega \Delta t_m + \theta_m - \omega \tau_m)}$. The CRPA filter 30 then computes the ABF weight vector $w = [w_1 \; w_2 \; \ldots \; w_M]$, subject to the signal protection constraint $w^H s = 1$, where $w^H$ is the conjugate transpose of w.

The $m^{th}$ component of the time-domain ABF input vector x can be written as $$x_m(t) = P(t+\Delta t_m - \tau_m)s_m e^{i\phi}$$

The time-domain ABF output is $$y = w^H x = \sum_{m=1}^{M} w_m^* P(t + \Delta t_m - \tau_m) s_m e^{i\phi}$$

where M is the number of channels (seven in this embodiment) and $w^*_m$ is the complex conjugate of $w_m$. The signal's correlation with the early code is $r_E = E[yP(t+C/2)^*]$, where $C \approx 98$ ns is the width of a code chip in this embodiment. Substituting for y yields $$r_E = e^{i\phi} \sum_{m=1}^{M} w_m^* s_m E[P(t + \Delta t_m - \tau_m)P(t+C/2)^*]$$

$$= e^{i\phi} \sum_{m=1}^{M} w_m^* s_m R(C/2 - \Delta t_m + \tau_m)$$

where R is the code's autocorrelation function:

$$R(t) = \begin{cases} 1 - |t|/C & \text{if } |t| \leq C \\ 0 & \text{if } |t| > C \end{cases} \quad (1)$$

Since $|\tau_m - \Delta t_m| < C/2$, the autocorrelation's value is $R(C/2 - \Delta t_m + \tau_m) = 1 - (C/2 - \Delta t_m + \tau_m)/C$. Therefore the early correlation is $$r_E = e^{i\phi} \sum_{m=1}^{M} w_m^* s_m \left( \frac{1}{2} + \frac{\Delta t_m - \tau_m}{C} \right) \quad (2)$$

$$= e^{i\phi} w^H s \frac{1}{2} + e^{i\phi} \sum_{m=1}^{M} w_m^* s_m \frac{\Delta t_m - \tau_m}{C}$$

$$= e^{i\phi} \left[ \frac{1}{2} + \frac{1}{C} \sum_{m=1}^{M} w_m^* s_m (\Delta t_m - \tau_m) \right]$$

The squared magnitude of the early correlation, neglecting terms that are second order in $(\Delta t_m - \tau_m)/C$, is $$|r_E|^2 \approx \frac{1}{4} + \frac{1}{2C}\sum_{m=1}^{M} w_m^* s_m (\Delta t_m - \tau_m) + \frac{1}{2C}\sum_{m=1}^{M} (w_m^* s_m)^* (\Delta t_m - \tau_m) =$$

$$\frac{1}{4} + \frac{1}{C}\sum_{m=1}^{M} \text{Re}(w_m^* s_m)(\Delta t_m - \tau_m)$$

Similarly, the squared magnitude of the late correlation is $$|r_L|^2 \approx \frac{1}{4} - \frac{1}{C}\sum_{m=1}^{M} \text{Re}(w_m^* s_m)(\Delta t_m - \tau_m) \quad (3)$$

The DLL's error signal is $|r_E|^2 - |r_L|^2$, and the pseudorange error in chips is one-half of the error signal. The pseudorange error $\delta_{PR}$ in units of time is $$\delta_{PR} = \sum_{m=1}^{M} \text{Re}(w_m^* s_m)(\Delta t_m - \tau_m) \quad (4)$$

$$\sum_{m=1}^{M} \text{Re}(w_m^* s_m) = \text{Re}(w^H s) = 1,$$

so $\delta_{PR}$ is a weighted average of the channel delays. Even if the channels all had zero group delay ($\tau_m = 0$), there would still be a pseudorange error due to propagation time differences ($\Delta t_m$).

Equation (4) can be used to correct pseudorange measurements in real time by the pseudorange error prediction module 50. Its inputs are:

w weight vector for one frequency bin (seven complex numbers per beam, one for each antenna element, computed by the CRPA filter 30).

s steering vector (seven complex numbers per beam, one for each antenna element)

$\Delta t_m$ wave propagation time difference=signal time of arrival at CRPA's reference element minus time of arrival at $m^{th}$ element (seven numbers per beam, one for each antenna element)

$\tau_m$ calibrated group delay of $m^{th}$ channel, including antenna and analog filter effects (14 numbers—one for each combination of antenna element and frequency—and possibly 14 sky maps, measured empirically during testing and stored in calibration tables)

$\theta_m$ calibrated phase shift of $m^{th}$ channel, including antenna and analog filter effects (14 numbers—one for each combination of antenna element and frequency—and 14 sky maps, measured empirically during testing and stored in calibration tables)

Frequency-Dependent Embodiment

Equation (4) may be accurate enough for some applications, but the accuracy can be improved. In general, the weights in the different frequency bins are unequal and so the problem has to be analyzed in the frequency domain. Start by defining $a_n$, the code's discrete Fourier transform (DFT):

$$P(kT) = \sum_{n=0}^{N-1} a_n z^{nk} \text{ for } 0 \le k < N \quad (5)$$

where T=32 ns is the sampling interval in this embodiment, N=128 is the DFT's size, and $z=e^{j2\pi/N}$. Let $b_{mn}$ be the DFT of the $m^{th}$ channel's baseband signal:

$$\sum_{n=0}^{N-1} b_{mn} z^{nk} = x_m(kT) = P((k-\gamma_m)T)s_m e^{i\phi} = \sum_{n=0}^{N-1} a_n z^{n(k-\gamma_m)} s_m e^{i\phi}$$

where $\gamma_m = (\tau_m - \Delta t_m)/T$. Equating like powers of z relates the baseband signal's DFT to the code's DFT:

$$b_{mn} = a_n z^{-n\gamma_m} s_m e^{i\phi} \quad (6)$$

The ABF output is a weighted sum of the DFT coefficients:

$$\hat{b}_n = \sum_{m=1}^{M} w_{mn}^* b_{mn} = \sum_{m=1}^{M} w_{mn}^* a_n z^{-n\gamma_m} s_m e^{i\phi}$$

where $w_{mn}$ is the $m^{th}$ channel's weight in the $n^{th}$ bin. The reconstructed time-domain signal is the inverse DFT of the ABF output:

$$\hat{x}(kT) = \sum_{n=0}^{N-1} \hat{b}_n z^{nk} = \sum_{n=0}^{N-1} \sum_{m=1}^{M} w_{mn}^* a_n z^{-n\gamma_m} s_m e^{i\phi} z^{nk} \quad (7)$$

The early correlation is $$r_E = E[\hat{x}(kT)P((k+d)T)^*]$$

where $d=\frac{1}{2}C/T$ is the half-chip correlator spacing expressed as a multiple of the sampling interval. This can be rewritten as $$r_E = E\left[\sum_{n=0}^{N-1}\sum_{m=1}^{M} w_{mn}^* a_n z^{-n\gamma_m} s_m e^{i\phi} z^{nk} \sum_{v=0}^{N-1} a_v^* z^{-v(k+d)}\right]$$

$$= \sum_{n=0}^{N-1}\sum_{m=1}^{M} w_{mn}^* z^{-n\gamma_m} s_m e^{i\phi} z^{nk} \sum_{v=0}^{N-1} E(a_n a_v^*) z^{-v(k+d)}$$

Computing the mean square values of the DFT coefficients $[E(|a_n|^2)=A_n]$ shows they are nearly uncorrelated, that is, $|E(a_n a_v^*)| \ll A_0$ for $v \ne n$. Therefore we can approximate the early correlation by neglecting terms for which $v \ne n$:

$$r_E \approx \sum_{n=0}^{N-1}\sum_{m=1}^{M} w_{mn}^* z^{-n\gamma_m} s_m e^{i\phi} A_n z^{-nd} = e^{i\phi} \sum_{m=1}^{M} \left(\sum_{n=0}^{N-1} w_{mn}^* A_n z^{-n(d+\gamma_m)}\right) s_m \quad (8)$$

(8) matches the simplified model of the early correlation given by (2) if $$w_m\left(\frac{1}{2} + \frac{\Delta t_m - \tau_m}{C}\right) = \sum_{n=0}^{N-1} w_{mn} A_n z^{n(d+\gamma_m)}$$

This gives us a way to compute an average weight $w_m$ to use in (2):

$$w_m = \frac{\sum_{n=0}^{N-1} w_{mn} A_n z^{n(d+\gamma_m)}}{\frac{T}{C}(d+\gamma_m)} \quad (9)$$

The same substitution also preserves the value of $r_L$ in (3) and hence, the DLL error signal and the pseudorange error as well. Therefore, we may use (4) to correct pseudorange measurements even when the weights in different frequency bins are unequal, as long as we first use (9) to compute the average weight. Unlike the simple method described earlier, which uses the weight vector in just one frequency bin, this method uses the weight vectors in all bins.

Two methods for compensating pseudorange measurements using equation (4) have been described. The frequency-independent method uses the weight vector from one frequency bin. Its advantage is that it is easy to compute. Its drawback is that its performance suffers if the jamming environment causes the weights to vary widely with frequency, but that drawback vanishes in CBF mode. The frequency-dependent method's advantage is that it is not affected by weight variations. Its drawback is that it must compute an average weight vector for each beam using (9). If the CRPA filter 30 computes the average weight, the receiver must send it seven $\gamma_m$ values per beam (one per antenna element) and the CRPA filter 30 must respond by sending one average weight vector per beam back to the receiver. If the receiver does the computation, the CRPA filter 30 must send it the weight vectors for all beams in all frequency bins.

The foregoing description has provided by way of exemplary and non-limiting examples a full and informative description of the exemplary embodiments of this invention. However, various modifications and adaptations may become apparent to those skilled in the relevant art in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus for calibrating a global navigation satellite system (GNSS) receiver system for group delay errors in GNSS transmitter signals, the apparatus comprising:
   a controlled reception pattern antenna (CRPA) comprising a plurality of receiving elements and configured to sense a plurality of signals from a plurality of GNSS transmitters using one or more transmitter frequencies;
   a signal conditioner configured to convert a plurality of sensed GNSS signals to a plurality of time domain digital signals;
   a processor configured to:
      convert the time domain digital signals into a plurality of filtered signals using a plurality of signal weights;
      access group delay calibration correction data for combinations of the plurality of receiving elements, a plurality of transmitter orientations with respect to the CRPA, and the one or more transmitter frequencies;
      track code modulations of the plurality of filtered signals and convert the filtered signals into GNSS pseudorange measurements for the plurality of GNSS transmitters at the one or more transmitter frequencies;
      combine the group delay calibration correction data and the signal weights to generate weighted pseudorange error corrections for the plurality of GNSS transmitters at the one or more transmitter frequencies; and
      combine the weighted pseudorange error corrections and the GNSS pseudorange measurements to generate corrected pseudorange measurements for the plurality of GNSS transmitters at the one or more transmitter frequencies.

2. The apparatus of claim 1, wherein the processor is further configured to:
   track the code modulations of the plurality of filtered signals and convert the filtered signals into pseudorange measurements by using a plurality of delay-locked loops; and
   determine the transmitter orientation with respect to the CRPA for each of the plurality of GNSS transmitters by obtaining a directional angle from the CRPA to each of the plurality of GNSS transmitters, obtaining an attitude of the CRPA, and combining the directional angle from the CRPA and the attitude of the CRPA for each of the plurality of GNSS transmitters.

3. The apparatus of claim 2, wherein the GNSS uses two or more transmitter frequencies and the group delay calibration correction data is further organized by the two or more transmitter frequencies.

4. The apparatus of claim 2, wherein the processor is further configured to:
   generate frequency-independent signal weights; and
   combine the group delay calibration correction data and the frequency-independent signal weights to generate the weighted pseudorange error corrections for the plurality of GNSS transmitters at the one or more transmitter frequencies.

5. The apparatus of claim 2, wherein the processor is further configured to:
   convert the time domain digital signals to frequency domain digital signals;
   compute frequency-dependent signal weights from the frequency domain digital signals; and
   combine the group delay calibration correction data and the frequency-independent signal weights to generate weighted pseudorange error corrections for the plurality of GNSS transmitters at the one or more transmitter frequencies.

6. The apparatus of claim 2, wherein the apparatus is configured to perform in real time.

7. The apparatus of claim 2, wherein the GNSS is Global Positioning System (GPS).

8. The apparatus of claim 2, wherein the CRPA has seven elements.

9. The apparatus of claim 2, wherein the apparatus is mounted on a static platform.

10. The apparatus of claim 2, wherein the apparatus is mounted on a dynamic platform.

11. The apparatus of claim 10, wherein the apparatus is mounted on an aircraft, ship, or land vehicle and wherein the apparatus determines the corrected pseudorange measurements accounting for the variable attitude of the dynamic platform.

12. A method for calibrating a global navigation satellite system (GNSS) receiver system for group delay errors in GNSS transmitter signals, the method comprising:
   sensing a plurality of signals from a plurality of GNSS transmitters with a controlled reception pattern antenna (CRPA) comprising a plurality of receiving elements using one or more transmitter frequencies;
   converting the plurality of sensed GNSS signals to a plurality of time domain digital signals;
   converting the time domain digital signals into a plurality of filtered signals using a plurality of signal weights;
   accessing group delay calibration correction data for combinations of the plurality of receiving elements, a plurality of transmitter orientations with respect to the CRPA, and the one or more transmitter frequencies;
   tracking code modulations of the plurality of filtered signals and converting the filtered signals into GNSS pseudorange measurements for the plurality of GNSS transmitters at the one or more transmitter frequencies;
   combining the group delay calibration correction data and the signal weights to generate weighted pseudorange error corrections for the plurality of GNSS transmitters at the one or more transmitter frequencies; and
   combining the weighted pseudorange error corrections and the GNSS pseudorange measurements to generate corrected pseudorange measurements for the plurality of GNSS transmitters at the one or more transmitter frequencies.

13. The method of claim 12, further comprising:
determining the transmitter orientation with respect to the CRPA for each of the plurality of GNSS transmitters by obtaining a directional angle from the CRPA to each of the plurality of GNSS transmitters, obtaining an attitude of the CRPA, and combining the directional angle from the CRPA and the attitude of the CRPA for each of the plurality of GNSS transmitters, wherein the tracking the code modulations of the plurality of filtered signals and converting the filtered signals into pseudorange measurements comprises using a plurality of delay-locked loops.

* * * * *